2,926,062

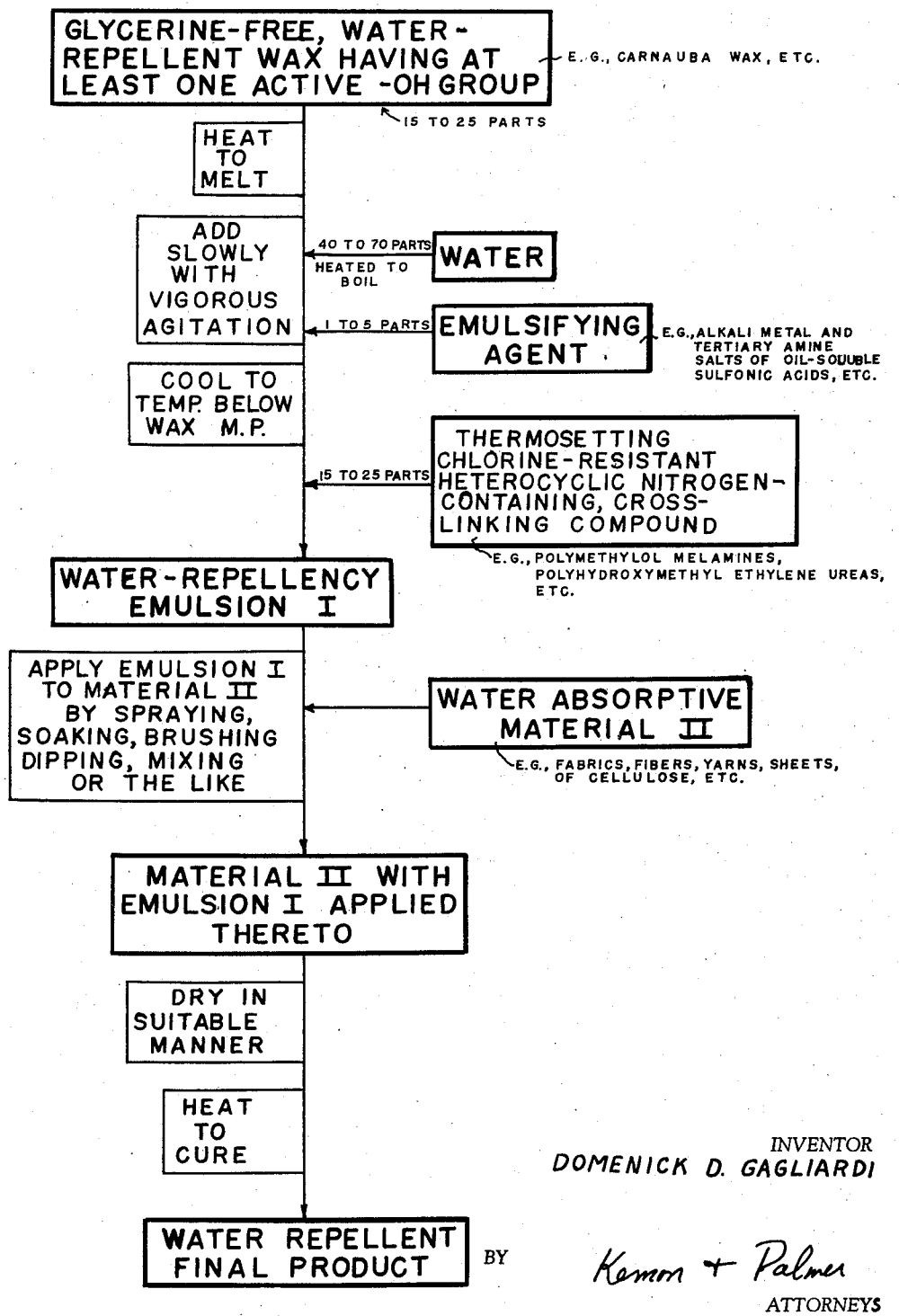

WATER REPELLENT COMPOSITIONS, PRODUCTS AND PROCESSES FOR MAKING SAME

Domenick D. Gagliardi, East Greenwich, R.I., assignor to Gagliardi Research Corporation, East Greenwich, R.I., a corporation of Rhode Island Application March 5, 1956, Serial No. 569,232

14 Claims. (Cl. 8—115.5)

This invention relates to new compositions of matter for treating materials to render them permanently water repellent and resistant to water-borne stains, to processes for the manufacture of such compositions of matter, to processes for treating materials with such compositions and to water repellent products made by such new treating processes.

FIELD OF THE INVENTION

Increased world-wide production and consumption of fibers, yarns, fabrics, films, boards, sheets and webs of many types, e.g., woven and non-woven textiles, paper, cardboard, plywood, cellophane, to mention a few, has brought a greatly increased demand for ways to render such products permanently water repellent and resistant to staining. For example, permanent water-resistance of textiles or other products mitigates or eliminates many damaging effects such as warping, rotting, shrinking and swelling. Likewise, staining or spotting of the materials is also reduced or stopped, e.g., staining of cloth, wallpaper, floor-coverings, or the like by water-borne stains including vegetable colors, inks, fruit juices, beverages, water-soluble dyes, urine and mud.

Historic attempts at making materials water repellent generally involved the use of rubber, drying-oil or wax coating compositions which more often made the materials "water-proof" rather than "water repellent," i.e., formed a gas and liquid impermeable structure such as "oil-cloth" rather than a structure which permits gas and liquid to pass through while resisting being wet by water or aqueous solutions. More recently, there have been developed various products and methods for making truly water-repellent fabrics, the majority of which utilize synthetic resins, e.g., aminoplast resins and silicone resins.

It is not difficult to make fabrics temporarily water-repellent. In contrast, the extremely large amount of work and effort expended by researchers and manufacturers with only very limited success has proven the great difficulty connected with making fabric permanently water-repellent. Thus, waxes applied from organic solvents will provide temporary water-repellency to fabrics, but this will not remain after the fabric is laundered or dry-cleaned.

Many prior workers have thought that they had developed satisfactory water-repellent fabrics, only to find that their products were unsatisfactory when put to the hard test of actual use in commerce. For example, many supposedly useful water-repellent compositions based upon urea-formaldehyde resins proved useless for treating cotton textiles because it was discovered that the textiles disintegrated following a laundering which used chlorine-containing bleaches and then an ironing. Thus, the compositions used to create the water resistance reacted with the chlorine bleach and when heated during the ironing, liberated chlorine which destroyed the fabrics.

Compositions and methods which at first appeared attractive for water-repellent treatments have proved useless for commercial operations. There have been various reasons for this. For example, it might be found that the treating compositions would not be stable on extended storage or under various conditions of use. Similarly, organic solvents required for making or using the treating compositions would be found to make them commercially unusable, or they adversely affected the color of the materials to which they were applied.

Today there are available for commercial use in the water-repellent treatment of fabrics only a few satisfactory methods. Hence, the textile trade has a real need for additional and better water-repellent treatments. Especially is there a need for such treatments which can produce water-repellent products at considerably lower cost than was possible prior to the present invention.

OBJECTS

A principal object of this invention is the provision of new compositions for treating filaments, yarns, fabrics, films, boards, sheets and other strands, or webs to render such materials permanently repellent to water and water-borne stains.

Further objects include the provision of water-repellent compositions:

(1) Which are free of glycerides or like materials which can become rancid;

(2) That use water as the primary vehicle so that they are dilutable with water and are compatible with the majority of textile finishing agents;

(3) Which are free of aluminum or ammonium soaps;

(4) Which are chlorine resistant, i.e., do not scorch or cause the fabric treated therewith to lose strength following chlorination and ironing;

(5) Which are so highly efficient that only 2–4% solids need be applied to a fabric to obtain maximum initial water repellency;

(6) Which are very stable on storage and have a shelf-life of at least one year;

(7) That are compatible with established textile finishing methods;

(8) Which are not pastes or gels and do not require milling or homogenizing before they may be used;

(9) Which are stable to hard water, organic acids and tolerate metal salts;

(10) Which are suitable for application to white textiles because they do not discolor cloth;

(11) Which do not present fire hazards in use since they do not contain hydrocarbon solvents or substantial quantities of other costly and hazardous organic solvents;

(12) Which do not have objectionable odors and do not create odors at any time in materials treated therewith;

(13) Which leave textiles after treatment with substantially the same body, feel, handle, color and other characteristics possessed by the textile prior to treatment;

(14) Which are capable of creating permanently water-repellent products, i.e., products which will not have the water-repellency destroyed by laundering, dry-cleaning or similar operations to which the treated products are subjected during normal use;

(15) Which may be used for treating many different types of strands or webs, e.g., nylon, polyvinyl alcohol, casein, proteins, wool, silk, and all cellulosic materials including cotton, rayon, wood, linen and cellophane strands or webs.

Additional objects include:

(A) The provision of new methods for treating webs or strands to render them permanently water-repellent.

(B) The provision of new commercially usable water-repellence producing methods which are relatively inexpensive, safe and compatible with existing textile finishing operations.

(C) The provision of new permanently water-repellent webs and strands which are free of odor, chlorine resistant, and capable of being repeatedly cleaned or laundered without losing water-repellency, and which have the desired feel, color, handle, flexibility and strength of the untreated material.

(D) The provision of new permanently water-repellent fabrics containing less than 5% of water-repellent agents and which are not impervious to fluids.

(E) The provision of new water-repellent fabrics which have a 100% spray resistant rating.

GENERAL DESCRIPTION

These objects are accomplished according to the present invention, in part, by the formation of treating compositions which comprise an oil-in-water emulsion containing:

(a) in the oil phase, a water-repellent wax which is substantially glycerine free and contains in its molecule at least one reactive hydroxyl group;

(b) in the water phase, a water soluble, thermosetting, chlorine resistant, heterocyclic nitrogen containing cross-linking agent which is non-reactive at least below 30° C. with the wax in the oil phase and which does not polymerize at least below 30° C., and;

(c) in the interface between the oil and water phases, a water soluble, anionic emulsifying agent capable of being rendered inactive as an emulsifier in the presence of said wax and cross-linking agent at elevated temperatures and which is non-reactive with the wax and cross-linking agent at least up to 30° C.

Since water is the vehicle for the emulsifying, it is present in the compositions in the largest amount. The wax and cross-linking agent are the other major components with the emulsifying agent being a minor component.

Relative proportions of the components of the treating compositions are not critical, although for practical and economic considerations, as well as effectiveness of results, preferred limits for the components may be specified. As an example, useful emulsions may contain 15 to 25 parts of wax, 15 to 25 parts of cross-linking agent, 1 to 5 parts of emulsifier and 40 to 70 parts of water. For economic reasons, it is desirable to produce an emulsion having as little water as possible and to subsequently dilute it with water before use.

Obviously, various available specific materials within the broad classes of basic components outlined above may be used in forming the new compositions. By way of example, for more detailed understanding of the classes of components, usable waxes include carnauba, candelilla, and sugar cane, cross-linking agents include tetra (methoxymethyl) acetylene diurea, bis (methoxymethyl) ethylene urea and bis (hydroxymethyl) ethylene thiourea, and emulsifiers include triethanolamine dodecylbenzene sulfonate, triethanolamine oleyl alcohol sulfate, and the sodium salt of oil-soluble petroleum sulfonic acids.

The new compositions are prepared by mixing the emulsifier with the melted wax, slowly adding to the melted wax and emulsifier, with agitation and at a temperature substantially above the melting temperature of the wax, a sufficient amount of water at a temperature substantially above the melting temperature of the wax to produce an oil in water emulsion, cooling the resulting emulsion below the melting temperature of the wax and mixing therewith the cross-linking monomer or condensate thereof.

The stated objects are further accomplished by treating strands, webs or other materials with the new compositions generally described above. This is accomplished by applying such compositions to the material, drying the resulting material and curing it by heating it at an elevated temperature for a time sufficient to permanently fix the composition to the material, presumably by a condensation reaction between the cross linking compound thereof with the treated material and the wax.

Although the operation of fixing the water-repellent compositions upon the treated strands or webs can be effected by heat alone without the use of a catalyst, in some instances it is desirable to employ an acidic catalyst of the type ordinarily used to promote condensation or acetal interchange reactions. When a catalyst is used, it is added to the composition before such composition is applied to the fibrous material.

Apparently, the reason why fibrous material treated in accordance with the present invention remains water and stain resistant even after repeated washings and dry cleaning is because the water-repellent wax is not removed from the treated fibrous material by such washing or solvent cleaning. Presumably, the reason why the wax is not removed is because these cross linkages permanently fix the wax to the fibrous material. A deactivation of the emulsifier under the treating conditions also appears to contribute to the final permanence of the water-repellent properties.

FLOW DIAGRAM

The accompanying drawing is a flow diagram of the M. O. Wolk form (30 J.P.O.S. 368) which graphically illustrates the operations and products of this invention. The flow diagram is designed to provide the reader with a concise picture of the operations and materials involved, but does not attempt, because of space limitations, to designate all of the various details of the new developments. For the details, the reader should refer to the following examples and detailed description.

EXAMPLES

A more complete understanding of the new methods, compositions and products of this invention may be had by reference to the following examples of actual operations in accordance with the invention, in which all parts are by weight unless otherwise specified.

Example I

In a jacketed kettle, equipped with a variable speed agitator and a thermometer, are charged 100 parts of carnauba wax and 100 parts of a candelilla wax. With the agitator off, steam is applied to the jacket. After 30 minutes, the waxes melt, and the agitator is started. To the molten waxes, while gently stirring, are added 20 parts of petroleum sodium sulfonate (an emulsifying agent sold under the trademark "Petronate L" by Sonneborn and Sons, Inc.). The mixture is heated, by controlling the flow of steam into the jacket, to 85–95° C. and maintained within this temperature range with continued gentle stirring for 15 minutes during which time it clears into a translucent straw colored liquid. The agitator is then turned on to full speed to give vigorous stirring action. Water at 95° C. is added slowly to the mixture 50 parts at a time. After the first water addition, the mixture is clear and translucent. The water addition is continued, allowing 5 to 10 minutes stirring time after each addition. When 150 parts of water have been added, the mixture inverts from a water-in-oil into an oil-in-water emulsion and becomes very fluid, and milky white in appearance. Addition of water is continued until a total of 480 parts are added (the last addition amounting to 30 parts of water). The resulting milky emulsion is allowed to stir vigorously at 90° C. for 30 minutes. Cooling water is then applied to the jacket and the stirring is reduced to a gentle swirling. When the temperature of the emulsion drops to 30° C., 300 parts of a crude, 80% active commercial bis (methoxymethyl) uron are slowly poured into the emulsion. The finished emulsion product is allowed to stir at 25 to 30° C. for 30 minutes and then it is drawn into drums where it may be held at least 6 months or more without deterioration for use in treating textiles or the like.

Example II

In a glass round bottom flask, equipped with a variable speed stirrer and thermometer, are charged 200 parts of white refined carnauba wax. The flask is heated until all the wax melts, when the stirrer is turned on. To the molten wax are added 20 grams of triethanolamine dodecylbenzene sulfonate (emulsifying agent). When the mixture clears and the temperature reaches 95° C., 50 parts of water at 95° C. are added and the mixture is vigorously stirred. Water addition is continued at the same rate as in Example I until a total of 480 parts of water are added. During the water addition, the mixture emulsifies into a bluish milky white fluid emulsion. After stirring vigorously at 85–95° C. for 15 minutes, the emulsion is quickly cooled to 25° C. using gentle agitation and an outside cooling water bath. To the cooled emulsion are added 300 grams of a 50% aqueous solution of bis (hydroxymethyl) ethylene urea. After stirring for 15 minutes at 25° C., the emulsion is drawn.

Example III

Using the same equipment as in Example II and the same processing operation, another emulsion product is prepared except that instead of the carnauba wax of Example II, 100 parts of sugar cane wax and 100 parts of carnauba wax are used, instead of the sulfonate of Example II, 20 parts of an amine alcohol sulfate (sold under the trade name "Duponol G" by E. I. du Pont de Nemours & Co. Inc.) are used, and instead of the urea of Example II, 300 parts of tetra (methoxymethyl) acetylene diurea are used. This emulsion is more viscous than those products from Examples I and II.

Example IV

Using the same equipment and process as in Example II, an emulsion product is prepared using 80 parts of candelilla wax, 80 parts of sugar cane wax and 80 parts of carnauba wax in place of the wax of Example II, using 25 parts of an amine alkyl aryl sulfonate (sold under the trademark "Ultrawet 60L" by the Atlantic Refining Co.) in place of the sulfonate of Example II, using 500 parts of water, and using 235 parts of bis (hydroxymethyl) ethylene thiourea in place of the urea of Example II. This product is a very fluid and stable emulsion.

Example V

Using the same equipment as in Example II and the same processing operation, an emulsion product is prepared using 75 parts of candelilla wax, 75 parts of carnauba wax and 75 parts of sugar cane wax in place of the wax of Example II, using 10 parts of amine alkyl aryl sulfonate (Ultrawet 60L) and 10 parts of petroleum sodium sulfonate (Petronate L) in place of the sulfonate of Example II, using 380 parts of water, and using 350 parts of a 50% solution of 1,3-bis (hydroxymethyl) 5-ethyl tetrahydro triazone instead of the urea of Example II.

Example VI

Using the same equipment and process as in Example II, another emulsion product is prepared using 200 parts of sugar cane wax in place of the wax of Example II, using 20 parts of amine alcohol sulfate (Duponol G) in place of the sulfonate of Example II, using 580 parts of water, and using 200 parts of bis (ethoxymethyl) ethylene urea in place of the urea of Example II.

Example VII

Using the same equipment and process as in Example II, another emulsion is prepared using 200 parts of white refined carnauba wax, using 20 parts of petroleum sodium sulfonate (Petronate L) in place of the sulfonate of Example II, using 580 parts of water, and using 200 parts of bis (isopropyloxymethyl) uron in place of the urea of Example II.

Example VIII

Using the same equipment and process as in Example I, a products is prepared using 50 parts of carnauba wax and 140 parts of a paraffin modified candelilla wax in place of the wax of Example I, using 20 parts of triethanolamine dodecylbenzene sulfonate in place of the sulfonate of Example I, using 530 parts of water, and using 250 parts of an 80% active, crude bis (methoxymethyl) uron. A fluid emulsion especially useful for treating nylon and similar synthetic fibers is obtained.

Example IX

A sample of cotton sateen fabric is soaked for one minute in a liquid containing 0.5 part of citric acid as catalyst, 15 parts of the product from Example I, and 84.5 parts of water. The cloth is passed through squeeze rollers to remove excess liquid and is then dried in an oven for 3 minutes at 120° C. The dried cloth is finally cured in a closed oven for 4 minutes at 155° C. The resulting cotton fabric is extremely water-repellent; it cannot be wetted by water either by spraying or soaking; it is highly resistant to staining by ink, grape juice, and food colors; and its resistance to water and waterborne stains is not changed substantially even after three dry cleaning operations in carbon tetrachloride or even after boiling for one hour in a soap solution.

Example X

The emulsion product from Example VIII is sprayed onto a piece of ordinary office blotting paper until a uniform coating is obtained. The sprayed paper is heated in a closed oven for 4 hours at 40° C. The resulting paper is found to be no longer absorbent and will not soak up ink.

Example XI

A piece of pine wood board is soaked for 30 minutes in a liquid containing 50 parts of the product from Example I, 1 part of ethanolamine hydrochloride as a catalyst and 49 parts of water. The wood is removed from liquid and then heated in a closed oven for 8 hours at 50° C. The resulting piece of wood cannot be wet by water and cannot stain with ink, coffee or grape juice. After scrubbing with a sponge and a soap solution followed by rinsing and drying, the piece of wood is still highly resistant to water and water-borne stains.

Example XII

A sheet of commercial grade wall paper is sprayed with the product from Example II. After drying in a closed oven for 1 hour at 50° C., the wall paper is found to be highly resistant to water-borne stains and cannot be soiled by ink or grape juice. After sponge washing with a soap solution followed by rinsing and drying, the wall paper is still highly resistant to stains.

Example XIII

Pieces of a cotton tackle twill fabric, a viscose tackle twill, a viscose butcher linen and a viscose-acetate gabardine fabric are soaked for 1 minute in a liquid containing 10 parts of the product from Example I, 0.3 part of citric acid and 89.7 parts of water. The pieces of cloth are then passed through squeeze rollers so as to remove excess liquid, but to leave enough liquid so that when each fabric is dried, it will have increased in weight by 3% due to deposited solids from the liquid of Example I. After drying and curing in one operation in a closed oven at 155° C. for 5 minutes, the treated fabrics are found upon removal to be highly resistant to waterborne stains and to have a very high degree of permanent water repellency as determined by the standarde mehods of the American Association of Textile Chemists and Colorists, Year Book 1954, pages 136, 137 and 138. The results of these standard water repellency tests are given below.

| Fabric Treated Product, Example I | Spray Test Ratings [1] | | |
|---|---|---|---|
| | After Treatment | After 3 Dry Cleanings | After Washing 1 Hour at 140° F. |
| Cotton Tackle Twill | 100 | 80 | 100 |
| Viscose Tackle Twill | 100 | 80 plus | 100 |
| Viscose Butcher Linen | 100 | 90 plus | 100 |
| Viscose-Acetate Gabardine | 100 | 90 | 100 |
| Untreated—All Fabrics | 0 | 0 | 0 |

[1] 100 denotes complete resistance to wetting by water spray and zero denotes complete wetting.

*Example XIV*

A non-woven fabric web made of viscose fibers is sprayed with the product from Example VI to which has been added 1 part of ammonium sulfate catalyst for each 10 parts of product. After drying and curing for 3 minutes at 165° C. in a closed oven, the treated web is found to be highly water resistant. When it is soaked along with an untreated web in water at 30° C. for one week, the untreated web disintegrates into a mass of loose fibers, while the treated web remains intact and is still water and stain resistant.

DETAILED DESCRIPTION

One major component of the new compositions is a water-repellent wax having at least one reactive hydroxyl group. By a water-repellent wax is meant one on which a drop of distilled water assumes a contact angle of greater than 90°.

Waxes which are derived from vegetable or plant materials and consist substantially of esters of $C_{24}$ to $C_{36}$ monocarboxylic acids and $C_{16}$ to $C_{36}$ aliphatic and complex alcohols are most suited for the preparation of products of this invention, e.g., sugar cane, candelilla and carnauba waxes. Although the crude natural products can be employed, it is preferred to use commercially refined grades of these waxes which have been bleached or purified to remove dark pigmented materials. However, any water-repellent wax, preferably a vegetable wax, having active hydroxy groups can be used. Such vegetable waxes may be used alone or admixed with minor portions of non-reactive waxes such as paraffinic waxes, or other water repellent materials which will not harmfully affect the emulsion or the fixation step.

Another major component of the new compositions is a heterocyclic nitrogen containing, water soluble, thermosetting, chlorine resistant crosslinking agent. More specifically, these agents are poly (oxymethyl) cyclic urea, thiourea or guanidine monomers or polymers. Structurally, these agents may be defined by the following formula:

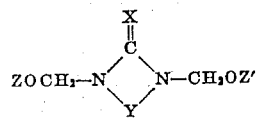

where Z and Z' may be the same or different and are selected from the group consisting of —H, —CH$_3$, —C$_2$H$_5$, and —C$_3$H$_7$; X is selected from the group consisting of =O, =S, and =NR, where R is selected from the group consisting of —H and —CH$_2$OZ; and Y is selected from the group consisting of:

(1) —CH$_2$—CH$_2$ (2) —CH$_2$—C—
             ||
             O (3) —CH$_2$—O—CH$_2$—

(4) —CH$_2$—N—CH$_2$—
          |
          Z (5) 

(6) 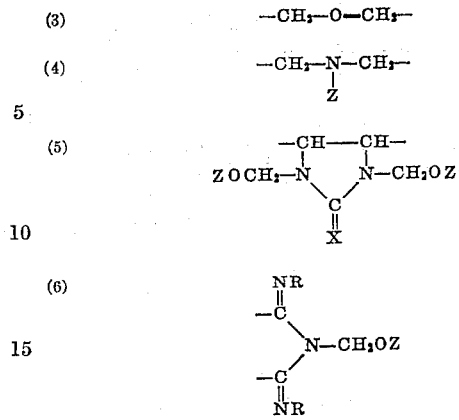

and the water soluble polymers thereof.

Specific examples of such agents include: poly (oxymethyl) ureas, e.g., bis (methoxymethyl) uron (see U.S. Patent 2,370,839); bis (hydroxymethyl) ethylene urea; tetra (hydroxymethyl) acetylene diurea; tetra (methoxymethyl) acetylene diurea; bis (hydroxymethyl) ethylene thiourea; bis (methoxymethyl) ethylene urea; 1,3-bis (hydroxymethyl) 5-hydroxyethyl tetra-hydrotriazone (see U.S. Patent 2,304,624); hexamethylol melamine; tri (methoxymethyl) melamine; and water soluble polymers thereof. Moreover, the crude reaction products of commerce which contain mostly the heterocyclic monomers or polymers thereof and small amounts of by-products of the reaction used in their preparation may also be used, as in Example VIII.

As examples of commercial materials usable as the chlorine resistant crosslinking agents are the methyl ethers of polymethylol melamines, e.g. "Aerotex M–3" sold by American Cyanamid Co. and "Resloom M–75" sold by Monsanto Chemical Co.; bis (hydroxymethyl) ethylene urea, e.g., "Rhonite R–1" sold by Rohm & Haas Co.; crude bis (methoxymethyl) uron, e.g., "Prym A" sold by Warwick Chemical Co.; crude mixtures of bis (methoxymethyl) uron and methyl and ethyl ethers of polymethylol ureas, e.g., "Emboset NR" sold by Metro-Atlantic Inc., "Rhonite R–2" sold by Rohm & Haas Co., "Vitaset" sold by Woonsocket Color and Chemical Co.; and tetramethylol acetylene diurea, e.g., "CET" sold by Onyx Oil and Chemical Co. Other useful commercial products are given in the above examples. In addition, the equivalent derivatives of thiourea and guanidine may be used.

A wide variety of usable emulsifiers are available for use in making the new compositions. As indicated, the emulsifier should be of a type which is water soluble and when subjected to the curing conditions used to thermoset the cross-linking agent, is rendered inactive as an emulsifier. Materials of this type are water soluble alkali metal and tertiary amine salts of oil-soluble sulfonic acids containing not less than 12 carbon atoms and not more than 22 carbon atoms and the sulfates of alcohols containing not less than 12 carbon atoms and not more than 22 carbon atoms, and especially those having the formula $$RSO_3M$$

where M is sodium, potassium or an aliphatic tertiary amine, particularly triethanol amine and R is selected from the group consisting of an aliphatic and alkaryl group containing not less than 12 carbon atoms and not more than 22 carbon atoms. Preferred emulsifying agents will produce storage stable, small particle size, and light colored emulsion products and which also do not interfere with the water and the water-borne stain resistance of the treated cellulosic material. Usable examples include sodium, potassium, and aliphatic tertiary amine salts of petroleum sulfonates, alkaryl sulfonates and long chain alcohol sulfates, particularly the sodium, potassium and triethanolamine salts of sulfated or sulfonated red oil, dodecyl benzene, lauryl alcohol, oleyl alcohol, petroleum, dodecyl naphthalene and glycerol esters of $C_{12}$ to $C_{18}$ fatty acids.

The preferred emulsifier in each of these three classes is, respectively, "Petronate L" manufactured by L. Sonneborn and Sons, Inc.; "Ultrawet 60L" manufactured by the Atlantic Refining Co.; and "Duponol G" manufactured by E. I. du Pont de Nemours and Co., Inc. These emulsifiers are preferred because of their apparently good ability to lose their emulsifying properties during the treatment of the fabric material and consequently do not take on or absorb water after such treatment.

As explained, the specified components may be used in varied proportions and the preferred proportions are 15 to 25 parts by weight of wax and of cross-linking agent to 1 to 5 parts by weight of emulsifier and 40 to 70 parts by weight of water. Unusually good results are obtained with equal parts by weight of the vegetable wax and the thermosetting cross-linking compounds. Performance tests have demonstrated, however, that even very small amounts of the thermosetting cross-linking compound will fix the vegetable wax to fibrous materials and produce permanent water and water-borne stain resistance in such materials. The degree of water resistance in such cases, however, is not optimum. When no thermosetting cross-linking compound at all is used in the emulsion product, only slight water resistance is obtained and this is completely removed by washing in water or in cleaning solvents. The minimum amount of water is the minimum amount with which a stable emulsion can be formed. The maximum amount is dictated only by economic considerations.

The minimum amount of emulsifier used is dictated only by the requirement that enough be present to maintain a stable emulsion. The maximum amount of emulsifier should not be so great as to obtain foaming of the emulsion, or to interfere with the water and stain resistance of the final material.

In the preparation of the emulsions of the present invention, preferably, the melted wax is maintained at a temperature between about 85–95° C. when the water is being added thereto and the water is added at a temperature between about 95° C. to 100° C. However, so long as the addition is carried out in such a manner that the mixture is at all times well above the melting temperature of the wax, satisfactory results are obtained. During the addition of the first portions of water to the melted wax, the water dissolves in the wax-emulsifier mixture and the melt remains clear. With further addition, the mixture begins to turn cloudy and finally the cloudy mixture inverts from a water in oil emulsion to an oil in water emulsion. It is important before such inversion that the water be added very slowly, preferably in stages and with violent agitation. However, after the inversion, the water may be added faster but should still be stirred vigorously.

The emulsion is preferably maintained below about 35° C. when the cross linking compound is added thereto. Temperatures between about 35° C. and 25° C. are most suitable. However, so long as it is at a temperature below the melting point of the wax the results will be satisfactory. The temperature of the melt is lowered before adding the cross linking compound to prevent premature condensation of such compound with the wax. Ordinarily substantially no condensation occurs below 35° C. However, the cross linking compound may be added at temperatures between 35° C. and just below the melting temperature of the wax so long as immediately thereafter the resulting emulsion is cooled to 35° C. or below.

Preferably water addition is not commenced until all the emulsifier has become thoroughly distributed throughout the melted wax. The emulsifier is thoroughly distributed when the melt becomes homogeneous in appearance.

The products of this invention are fluid, milky, white emulsions of fine particle size and stability and require no homogenization or further mechanical grinding actions.

It will be apparent to those skilled in the art of waterproofing fibrous materials that in commercial practice the compositions of this invention can be easily applied at any stage in the preparation of the fibrous material. For example, in the case of textile cellulosic materials, the products of this invention may be applied to the fibers before spinning, to the yarns before weaving, and to the final woven fabric. In the case of paper cellulosic materials, the products of this invention may be mixed with the pulp in the beater or may be applied to the formed paper sheet. In the case of wood panels, poles, and other dense woody materials, the products of this invention can be sprayed on or brushed on the wood surface.

In all of these operations, after the fibrous material has had the compositions of the present invention applied thereto by spraying, soaking, brushing, etc. it is dried in suitable drying chambers and then cured by further application of heat.

During the curing step, the solid products of the emulsions of this invention become permanently fixed to the cellulosic material. While the curing operation can normally be done at any temperature, the time and temperature of cure are inversely related and practical consideration will determine the exact conditions for handling different types of fibrous materials.

In the case of textile products, the preferred method of curing the fiber, yarn, or fabric is to place the item in a heated over at 150–200° C. for from 1 to 5 minutes. In the case of heat sensitive materials such as paper, the preferred method of curing is to place the paper sheet in an oven at 30–50° C. for 1 to 5 hours. Generally speaking, a time and temperature is used which will cause the cross-linking compound to react or condense with the fibrous material and wax with the evolution of alcohol, when an alkoxy methyl cross-linking compound is used, or with the evolution of water, when a hydroxymethyl cross-linking compound is used, but the temperature should not be so great as to cause decomposition or damage to either the wax, the particular fibrous material or the cross-linking compound. The curing temperature may range from about 30° C. for a period of one hour or more to about 200° C. for periods less than one minute. At temperatures below 30° C. the reaction is so slow as to be economically impractical. At temperatures above 200° C., damage to the material being treated is apt to occur. If desired, the curing and drying step may be carried out simultaneously.

In any application of the products of this invention to fibrous materials, the rate at which they can be cured and fixed to the fibrous material can be greatly accelerated by using acidic curing catalysts of the type ordinarily used in condensation or acetal interchange reactions, including ammonium sulfate, ethanolamine hydrochloride, citric acid, and magnesium chloride.

The fibrous materials which can be treated in accordance with the present invention include any strands or webs of materials or compounds having an active hydrogen atom, such as materials containing an active —OH group, —NH group, —NH$_2$ group etc. For example, the present invention contemplates the treatment of cellulose and cellulose derivatives in any of their forms, such as wood, cotton, paper, cellophane, cellulose acetate, rayon, linen, and the like, protein fibers, such as wool, casein, peanut protein, silk and the like, polyamide fibers such as nylon and polyvinyl alcohol fibers. The invention may be applied to any material made up basically of thread-like fibers or structures, whether in the form of a film such as a cellophane film, in the form of a fabric, in the form of wood, or other forms.

In treating textiles, the composition of the present invention can be modified by including therewith other textile finishing and treating agents, such as fire proofing agents, shrink proofing agents, moth proofing agents, mildew proofing agents etc., without departing from the scope of the invention.

When prepared and applied to fibrous materials as herein described, the products of this invention produce fibrous materials which have a remarkably high degree of permanent water repellency and resistance to soiling, spotting, and staining from water soluble colored materials including inks, vegetable colors, fruit colors, dyes, urine, blood, colored beverages, wines and mud. The products of this invention are particularly useful for producing permanently water-repellent cotton, viscose, and linen fabrics; for producing waterproof, splashproof and stain resistant wallpaper; for producing water-repellent cellophane; for increasing the wet strength and water resistance of paper and cardboard products and containers; for producing furniture coatings which are resisant to spotting and staining; for producing waterproof wood boards, piling, poles, and plywood panels; and for increasing the wet strength of regenerated cellulose fibers.

It is not intended that the invention hereof be limited in any manner by any theoretical explanations set forth herein.

The above description and examples are intended only to be illustrative. Any modification of or variation therefrom which conforms to the spirit of the invention is intended to be included within the scope of the claims.

I claim:

1. A composition of matter for treating materials to make them water repellent, comprising an oil in water emulsion containing in the oil phase a water repellent, glyceride-free vegetable wax having at least one reactive hydroxyl group; in the water phase a water soluble, thermosetting chlorine resistant cross-linking compound (III) selected from the group consisting of a thermosetting cross-linking heterocyclic nitrogen poly (oxy methyl) monomers of the formula:

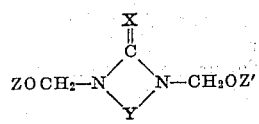

where Z and Z' may be the same or different and are selected from the group consisting of —H, —CH₃, —C₂H₅, and —C₃H₇; X is selected from the group consisting of =O, =S, and =NR, where R is selected from the group consisting of —H and —CH₂OZ; and Y is selected from the group consisting of:

(1) —CH₂—CH₂—

(2) —CH₂—C—
         ‖
         O (3) —CH₂—O—CH₂—

(4) —CH₂—N—CH₂—
         |
         Z (5) —CH——CH—
    |      |
ZOCH₂—N    N—CH₂OZ'
      \\  /
       C
       ‖
       X (6) 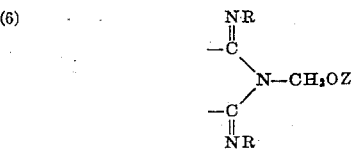

and the water soluble polymers thereof; and at the interface between the wax and water, a water soluble, anionic emulsifying agent which is selected from the group consisting of the sodium, potassium and tertiary amine salts of oil soluble sulfonates of the formula RSO₃H wherein R is selected from the group consisting of aliphatic and alkaryl groups containing not less than 12 carbon atoms and not more than 22 carbon atoms.

2. The composition of claim 1 wherein said vegetable wax is selected from the group consisting of a carnauba wax, a candelilla wax, a sugar cane wax and mixtures thereof.

3. The composition of claim 1 wherein the emulsifier is triethanolamine dodecylbenzene sulfonate.

4. The composition of claim 1 wherein the emulsifier is triethanolamine oleyl alcohol sulfate.

5. The composition of claim 1 wherein the emulsifier is petroleum sodium sulfate.

6. The composition of claim 1 wherein said cross-linking compound comprises tetra (methoxymethyl) acetylene diurea.

7. The composition of claim 1 wherein said cross-linking compound comprises bis (hydroxymethyl) ethylene thiourea.

8. The composition of claim 1 wherein said cross-linking compound comprises bis-(methoxymethyl) uron in the form of a crude mixture thereof with its partial polymers.

9. The composition of claim 1 wherein said cross-linking compound is bis (methoxymethyl) ethylene urea.

10. The composition of claim 1 wherein said wax comprises a mixture of equal parts of carnauba and candelilla waxes; the cross-linking compound consists of bis (methoxymethyl) uron in the form of a crude mixture thereof with partial condensates thereof; and the emulsifier consists of sodium petroleum sulfonate.

11. The method of rendering a material composed of cellulose, cellulose derivatives, polyvinyl alcohol, nylon or protein water repellent which comprises applying to the material a composition as defined in claim 1, drying the resulting material and subjecting it to a temperature at which the solids of the composition are for the most part permanently fixed to said material.

12. A water repellent strand or web comprising the condensation product of a water-repellent, glycerine-free vegetable wax containing at least one active hydroxy group in its molecule, a water soluble, thermosetting chlorine resistant, heterocyclic nitrogen containing cross-linking compound (III) as defined in claim 1, and a strand or web material composed of a substance selected from the group consisting of cellulose, cellulose derivatives, nylon, polyvinyl alcohol and proteins.

13. The product of claim 12 wherein said wax is selected from the group consisting of a carnauba wax, a candelilla wax, a sugar cane wax and mixtures thereof.

14. The product of claim 12 wherein said wax comprises a mixture of equal parts of carnauba and candelilla waxes and the cross-linking compound comprises bis (methoxymethyl) uron.

References Cited in the file of this patent

UNITED STATES PATENTS

| | | |
|---|---|---|
| 2,375,348 | Cohen | May 8, 1945 |
| 2,399,489 | Landes | Apr. 30, 1946 |
| 2,603,576 | Cook | July 15, 1952 |
| 2,690,404 | Spangler | Sept. 28, 1954 |
| 2,731,364 | Reibnitz et al. | Jan. 17, 1956 |

UNITED STATES PATENT OFFICE

CERTIFICATE OF CORRECTION

Patent No. 2,926,062            February 23, 1960

Domenick D. Gagliardi

It is hereby certified that error appears in the printed specification of the above numbered patent requiring correction and that the said Letters Patent should read as corrected below.

Column 6, line 8, for "products" read -- product --; column 7, lines 1 and 2, for "standarde mehods" read -- standard methods --; line 72, formula (1), for "—$CH_2$—$CH_2$" read -- —$CH_2$—$CH_2$— --; column 10, line 37, for "over" read -- oven --; column 11, line 60, formula (1), for "—$CH_2$—$CH_2$" read -- —$CH_2$—$CH_2$— --.

Signed and sealed this 9th day of August 1960.

(SEAL)
Attest:

KARL H. AXLINE            ROBERT C. WATSON
Attesting Officer            Commissioner of Patents